United States Patent

Lester et al.

[15] 3,652,444

[45] Feb. 28, 1972

[54] CONTINUOUS VACUUM PROCESS APPARATUS

[72] Inventors: William C. Lester, Hopewell Junction; Carlo Nuccio, Poughkeepsie; Ernest S. Ward, Fishkill, all of N.Y.

[73] Assignee: International Business Machines Corporation, Armonk, N.Y.

[22] Filed: Oct. 24, 1969

[21] Appl. No.: 869,295

[52] U.S. Cl. ....................204/298, 34/242, 214/17 B

[51] Int. Cl. ....................C23c 15/00

[58] Field of Search ....................214/17 B; 34/242; 204/298

[56] References Cited

UNITED STATES PATENTS 3,314,873 4/1967 Lunsford ....................214/17 B X 3,428,197 2/1969 Fischer et al. ....................214/17 B

*Primary Examiner*—Robert G. Sheridan

*Attorney*—Hanifin and Jancin and Henry Powers

[57] ABSTRACT

The invention is directed to a continuous vacuum multiprocessing system for treating, evaporation, or sputter vacuum depositing on a substrate or wafer for the preparation of semiconductors. The utilized structure comprises an annular chamber partitioned into alternating process and isolation compartments which are circularly arranged around a common (central) vacuum manifold. A circular transport ring, confined to the evacuated annular mechanically transports (via rotation) the substrates through the various serially connected compartments.

13 Claims, 6 Drawing Figures

INVENTORS
CARLO NUCCIO
WILLIAM C. LESTER
ERNEST S. WARD

BY Henry Powers
ATTORNEY

CONTINUOUS VACUUM PROCESS APPARATUS

FIELD OF THE INVENTION

This invention relates to a continuous vacuum multiprocessing system for such processing as vacuum treating i.e., degasing, sputter cleaning, and the like), evaporation and sputter deposition, electron beam application, of a suitable substrate (i.e., silicon wafer) for the fabrication of semiconductor devices.

DESCRIPTION OF THE PRIOR ART

In the main, the invention is directed to a multi-processing system wherein substrate or wafer elements can be continuously processed. In such a system, the substrate is carried into a sequence of vacuum processing chambers or regions in some of which sputter or evaporation processes can be provided for the deposition of various deposits on the transported element. The processes usually involve an appropriate arrangement to place substrate elements on a transport for successive movement through various steps. To do this the substrates or wafers move in sequence through an evacuated series of chambers so that with movement from one to another of these chambers or regions sputter treating and/or subjection to evaporation or other vacuum processing occurs while there is continual confinement of the substrates to a vacuum environment.

Until now it has been largely the custom to prepare the substrates by resorting to a so-called in-line process wherein the substrates are placed upon suitable carriers for movement by an appropriate conveyor means from an entrance chamber through to an end chamber, from which they are removed following processing. In this type of operation, the substrates or wafers are passed through a series of controlled environments or processing chambers such that vacuum deposition, sputtering or other vacuum processes can be achieved. Such systems require not only a substantial amount of space but separate vacuum systems for each stage or compartment. Likewise, they require separate loaders or unloaders to place the substrates or wafers upon the carrier and then to remove them, frequently requiring complex automated controls.

The maintenance requirements of an in-line system are usually greatly increased in accordance with the number of individual pumping systems that are required. The overall system, size, space requirements, as well as maintenance difficulties, therefore are manifest and considerable.

SUMMARY OF THE INVENTION

The present invention aims to eliminate many of the inherent design construction and operational limitations of conventional in-line continuous vacuum deposition and processing systems. To achieve this end result in its most simplified form, the invention comprises the series of basic vacuum chambers. By way of simplification these are formed essentially of two concentric cylindrical elements which are sealed at their outer ends to close them off and to form an annular enclosure of a generally toroidal shape. The several separate chambers of regions necessary to treat the substrates or wafers properly from the point of entrance to the point of exit are formed by various radial partition assemblies extending between the concentric cylinders. A circular transport ring, confined to the annular chamber, mechanically transports (via rotation) the substrate through the various chambers that are interconnected by the various radial partition assemblies which in turn define isolation compartments between adjacent processing chambers. In this form of structure the enclosed volume within the inner cylinder readily functions as a common vacuum manifold communicating directly to the individual processing chambers and the isolation compartments (defined by the radial partition assemblies) through suitably controlled apertures. Such a controlled aperture may be the well known type of variable conducting throttle value mounted upon the inner cylindrical wall. A device of this type makes it possible to maintain the desired degree of vacuum control within the individual processing chambers via a single vacuum pumping system.

In this type of operation, the central vacuum manifold obviously would be maintained at the lowest pressure in the system by a direct communication to a high speed pumping system. Each individually pumped chamber can be maintained selectively at a slightly higher pressure relative to the central vacuum manifold. Furthermore, each isolation compartment, defined by a radial partition assembly, is maintained at a selective pressure lower than that of the adjacent processing chambers and higher than that of the central vacuum manifold. The radial partition assembly in combination with the substrate carrier ring further provides (via differentially pumped high impedance slots) an effective barrier to any substantial communication between processing chambers. This insures control of process environment in the individual processing chambers and efficient isolation of one process environment from another.

From the foregoing, it is apparent that one of the main objects of this invention is that of providing a continuous vacuum for processing substrates or wafers in a highly efficient manner with provisions optionally made, if desired, for automatic loading, processing and unloading.

Another object of the invention is that of providing a vacuum system for treating substrates or wafers wherein the vacuum pressure can be accurately controlled in different processing regions and the overall system size and space requirements substantially reduced.

The foregoing and other objects, features and advantages of the invention will be apparent from the following more particular description of the embodiment(s) of the invention, as illustrated in the accompanying drawings.

DESCRIPTION OF THE PREFERRED EMBODIMENT

If reference is now made to the foregoing drawings, it can be appreciated that the unit comprises essentially two cylindrical elements 11 and 12 at the ends of which are secured upper and lower closure plate members 15 and 16, respectively.

Figure 1:
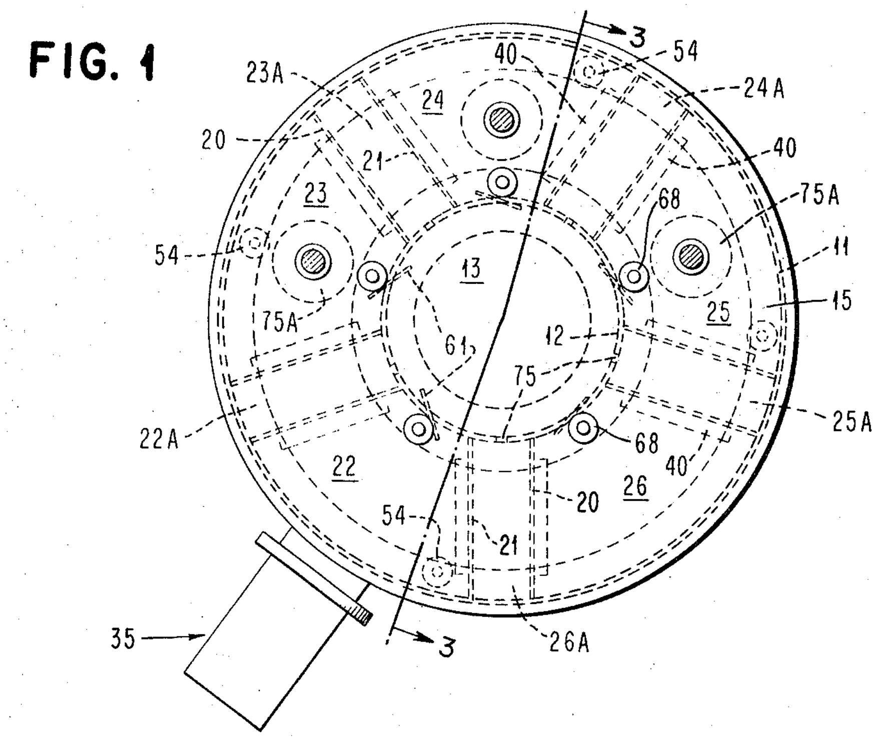
FIG. 1 is a general top plan view with significant interior portions of the apparatus shown in phantom.

The inner cylinder 12 which forms the vacuum manifold 13 provides for connecting into a central vacuum pump 13A. FIG. 1. FIGS.

Figure 3:
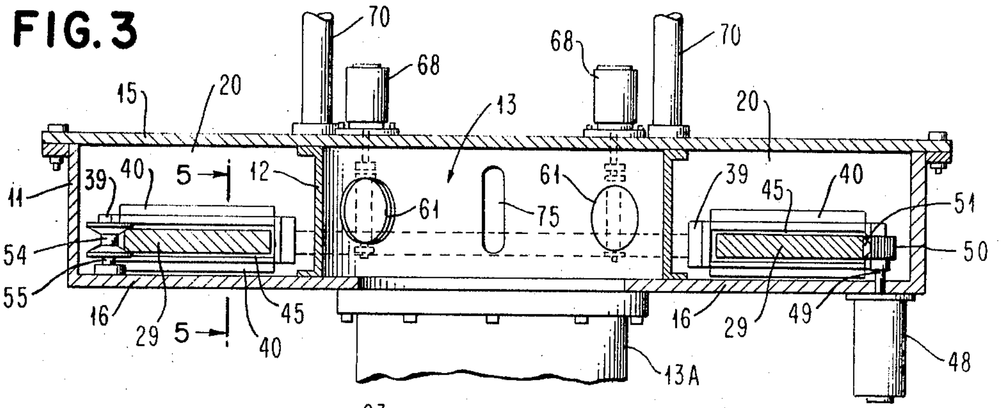
FIG. 3 is a sectional elevation taken on the line 3—3 of FIG. 1 to illustrate both the general drive system and the nature of the throttle valve control effective from one chamber to another.
Figures 4, 5, 6:
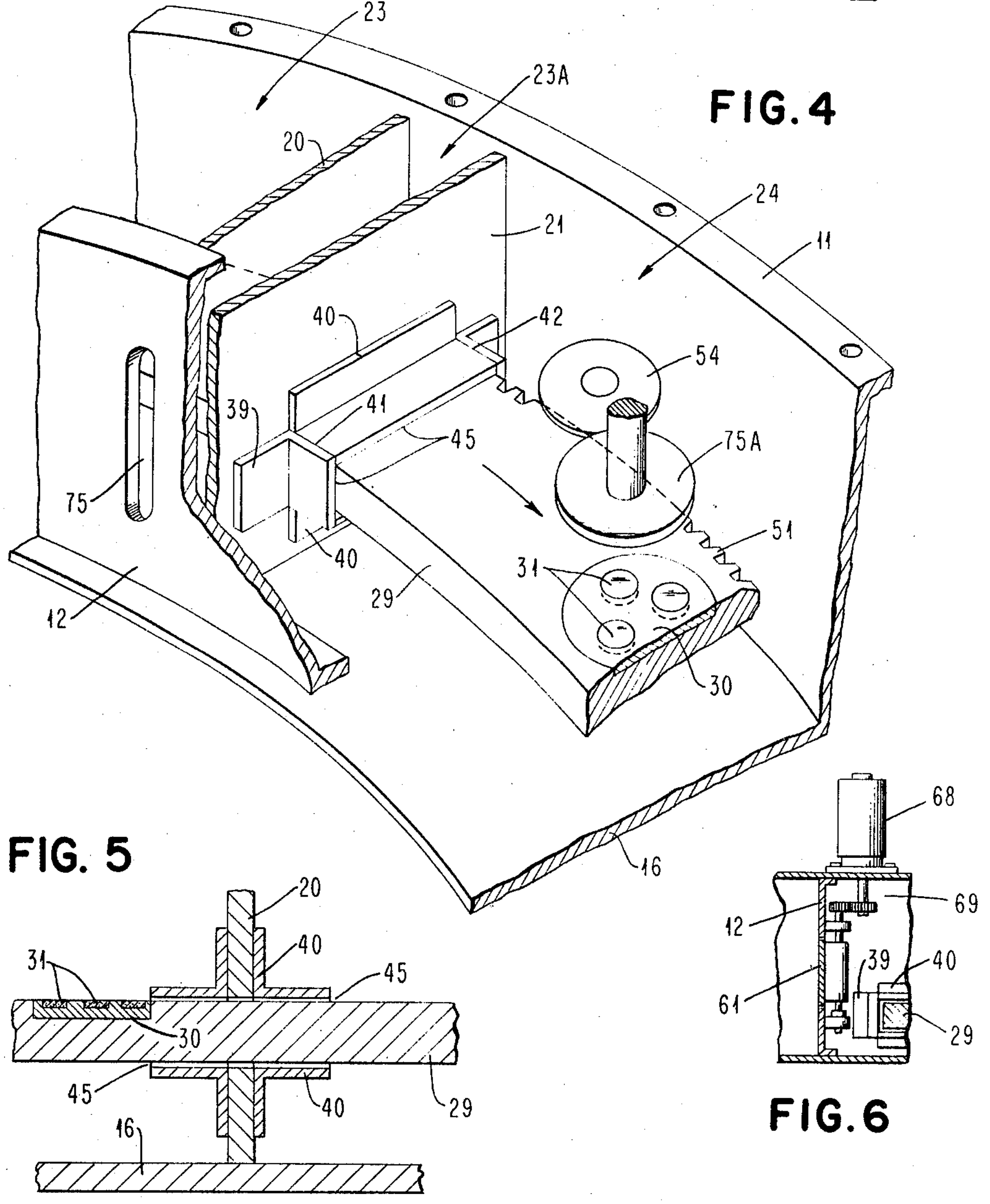
FIG. 4 is a partial interior view, partially in section, to show the manner of controlling the movement of the different substrates or wafers through the unit by way of the movable ring member.
FIG. 5 is a sectional view, taken generally on the line 5—5 of FIG. 3, and illustrates, in particular, the rotary support ring for holding the carriers for the different substrates as they are moved on the rotary ring-like member from one vacuum chamber to another between a loading and an unloading position.
FIG. 6 is a partial section in elevation to show an illustrative form of drive for the controllable throttle valve.

Between the outer and inner cylinders 11 and 12, as seen more particularly by FIG. 4, numerous suitable radial partition assemblies such as 20 and 21, extending generally radially, divide the arrangement into a number of separate processing regions or chambers, such as 22 through 26, inclusive, which are shown particularly in schematic form in FIG -. These separate chambers are constructed so that a ring-like member 29 (see particularly FIGS 3, 4 and 5) may be suitably rotated within and through them to carry substrate or wafer holding transport trays 30 in which the substrates or wafers 31 for processing are appropriately held.

A conventional air lock element 35 leads into one of the chambers 22 and provides for loading and unloading the wafers or substrates 31 upon the trays carried on the rotary ring member 29. The control here provides essentially a vacuum locking device which isolates the load and unload chamber from all other portions of the unit. Isolation of the vacuum processing chambers (22 through 26 of the assembly) is achieved and effected by providing an extremely close tolerance between the substrate carrier ring 29 and a differentially pumped isolation compartment 22A partition assemblies 20/22 as insured by the arrangement of the radial partition from members such as 20 and 21 (see FIG. 4).

As can be seen particularly from FIG. 5, the carrier ring 29, with the wafer carrying element 30 recessed therein is arranged to pass from one chamber, such as 23, into an adjacent chamber 24, through openings provided in the walls of the radially extending partition assemblies members 20 and 21. These openings are usually arranged in a rectangular form through the use of a series of right angled duct-like elements, such as 39, 40 and others, of like character which are joined at abutting edges, such as 41 and 42, to provide a controlled leakage path 45 at both the top and the sides through which the ring 29 moves. One side of the angled elements is fastened to the partition wall, as shown, while the other side is free, except for the connection at the abutting edges which are usually welded or soldered to make a tight fit. This controlled leakage path 45 provides efficient isolation of one process environment from another.

As indicated particularly by FIGS. 3 and 4, the ring member 29 may be driven from any desired form of prime mover such as the schematically represented motor 48 with its shaft 49 extending through the lower plate member 16 and terminating in a driving gear of pinion 50. The outer edge of the ring-like carrier 29 is formed as a toothed member 51 with the teeth adapted to mesh with the teeth of the driving pinion 50 so that rotation is readily achieved. Of course, other forms of drives, such as frictional members, may be utilized. The showing made here is purely for convenience and is intended to be purely schematic and diagrammatic in character.

The driving ring 29 is supported at various regions of its periphery in guide rollers 54 which are carried upon spindles, such as 55, from the lower support member 16. Thus, as the ring 29 rotates, the shaping of the guide rollers 54 is such as to permit the toothed edge to be driven therein, as desired.

As can be appreciated from the showing of FIG. 1, the central vacuum manifold 13 is common to all of the formed chambers.

Figure 2:
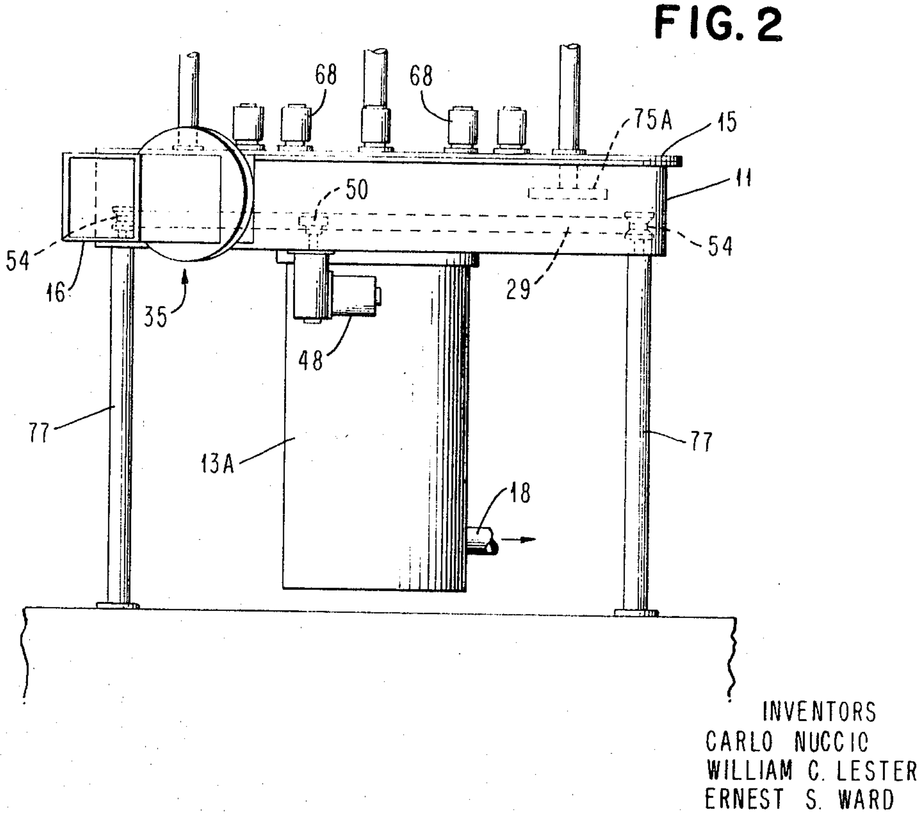
FIG. 2 is an elevational view showing, in particular, a control mechanism for various throttle valves to maintain the desired degree of vacuum in different processing or treating regions or chambers.

A valve element 61 of the generally butterfly type leads from each formed processing chamber into this central manifold and by suitable rotation of the valve the processing chamber can be opened up to the manifold or can be closed off therefrom. In this way, a single high speed vacuum pumping system 13A, such as a diffusion or turbo pump, if connected to lead to vacuum manifold 13, can provide the necessary vacuum to all of the different formed processing chambers and radial partition assemblies. As indicated in FIG. 2, the pumping system can be further connected to various mechanical pumps for establishing the desired vacuum level.

Each of the separate throttle valves constitutes an controllably variable conductance element which is supported in the inner cylindrical wall. It is thus possible to have a multiplicity of differentially pumped processing chambers because of the radial partition assemblies separating each from the central vacuum manifold. Each separate throttle valve is controllable from the conventionally indicated drive elements 68, whose position may be preset and/or controlled by way of a suitable manipulating element 70 (see particularly FIG. 3, for instance).

The vacuum manifold communication to the radial partition assemblies between the separate chambers, such as 24 and 25, is provided by a fixed or controllable conductance entrance port 75 connected to corresponding isolation compartments between walls such as 20 and 21, so that the pressure therein is almost as low as that within the manifold 13 leading to the vacuum pump. Because of leakages and similar effects, this isolating region or compartment is usually at a slightly higher pressure than that of the vacuum manifold. The highest system pressure is, of course, found within such chambers as 22, 23, 24, 25, etc. It is these regions or compartments which constitute the various processing component volumes.

The wafer carrying elements 30 of the carrier ring 29 successively move within the different processing chambers and, as this occurs, the supported substrates or wafers which may be included within an appropriate atmosphere introduced in any appropriate and desired manner may be sputter-treated by RF excitation of the sputtering cathode elements 75A positioned within the various chambers or other vacuum processes. If desired, and in order that the relative pressures in the different chambers shall be separably controllable, it is apparent that each of the control mechanisms conventionally represented for turning the throttle valves with each which may be automatically operated. The directly pumped controlled leakage slots 45 in the radial partition assembly 20/21 eliminate process chamber contamination from one compartment to that adjacent to it.

In the operation, the substrate carrier ring 29 is confined to the vacuum environment. This reduces out-gassing. The directly pumped radial partition assemblies, as already noted, serve substantially to eliminate compartment contamination.

It has been found that, generally speaking a 4 ft. diameter circular processing chamber is approximately the equivalent of an 11 ft. length in-line section. Further than this, as can be appreciated from the showings of FIGS. 1 and 2, in particular, the circular processing system is one which provides for substrate loading and unloading in adjacent areas, as contrasted with the in-line system which requires loading and unloading at opposite ends of the system. A unit of this character may be supported in any desired fashion, such as by support legs 77 of any desired number.

In addition, the circular arrangement here described with the centrally located pumping system beneath the processing chamber makes necessary only the provision of a single pump-out unit, usually encountered in the conventional continuous processing systems which require more floor space.

The system here disclosed thus has the advantage of requiring but a single high speed pumping system which is normally only about half the price of five smaller pumping systems which would be required normally for the equivalent conventional continuous system. The single pumping system and single partitioned vacuum chamber afford further advantage in that servicing, maintenance and fabrication cost are much less than that associated with the conventional continuous system.

With this arrangement, the loading of wafers or substrates, as well as the unloading thereof, is achievable by any desired form of simple automatic method and permits a continuous operation without causing the environment to vary. It is also readily controllable by any desired form of computer control for different types of processing and purely automatic operation.

Thus, while the invention has been particularly shown and described with reference to the preferred embodiments thereof, it will be understood by those skilled in the art that the foregoing and other various changes in form and details may be made therein without departing from the spirit and scope of the invention.

What is claimed is:

1. Module apparatus for the continuous processing of substrates in a vacuum environment comprising:

a plurality of sequentially arranged processing first regions, each of which is adapted for the performance of at least one processing step; and wherein said first regions define corresponding vacuum chambers disposed in a ring about a common axis;

a common vacuum pumping system for all processing first regions;

means for connecting a central vacuum manifold to evacuate all chambers simultaneously by said pumping system directly pumped second regions interconnected between adjacent ones of said first regions for isolation of the first regions;

first means to individually communicate each separate first region to the vacuum system via said manifold during selected treatments;

second means to move the substrate from one first region to another via said second regions in a preestablished indexed order and time, and third means to load and unload the substrate at the start and end of the process.

2. The apparatus claimed in claim 1 comprising, in addition, transport means to move the substrates from one to another first region in sequence via said second regions while subjected to the continuous influence of the vacuum system.

3. The apparatus claimed in claim 2 comprising, in addition, a controlled conductance means connected independently between each first region and the first means to control the established pressure of each first region independent of the other.

4. The apparatus claimed in claim 3 including means for connecting the central vacuum manifold to evacuate said second regions simultaneously with said chambers.

5. The apparatus claimed in claim 4 wherein said transport means comprises:

a substrate holder;

a rotable carrier ring coextending through said chambers and said second regions for supporting said substrate holder; and means to support the substrate holder in each vacuum chamber and to move the substrate holder between an entrance and exit position sequentially by the carrier ring.

6. The apparatus claimed in claim 5 wherein said second regions comprise a directly pumped isolation compartment between adjacent vacuum chambers, and including a controllable pumping aperture located between the said compartment and the central vacuum manifold to thereby provide isolation between adjacent process chambers.

7. The apparatus claimed in claim 6 comprising, in addition, a variable impedance throttle valve connected between each vacuum chamber and the central vacuum manifold means, thereby to establish the degree of of vacuum desired in each chamber.

8. The apparatus claimed in claim 5 comprising, in addition, means to provide the entrance and exit positions for transport to and from atmospheric pressure.

9. A vacuum chamber structure for treating substrates comprising:

a pair of concentrically supported cylindrical members;

means of covering the ends of the said supported cylinders;

the interior of the smaller of the concentric cylindrical members being adapted for connection to a vacuum system to provide a common pumping manifold for communication with the annular space formed between said members;

a multiplicity of directly pumped spaced regions dividing said space into a multiplicity of spaced isolated vacuum processing chambers within the said space;

a rotable substrate transport ring confined to and supported within the vacuum environment and said ring coextending through said first regions and said chambers;

means to rotate the ring through and within the chambers and regions to transport any supported substrates from one to another of the processing chambers;

vacuum locking means to isolate said space adjacent said vacuum locking means to permit substrate entrance and exit at desired positions at substantially atmospheric pressure; and means to load and unload the substrate elements upon the transport ring.

10. The structure claimed in claim 9 comprising, in addition, means in selected formed chambers for sputter and/or vacuum treating substrate elements moved therethrough.

11. The structure claimed in claim 10 comprising, in addition, a vacuum locking device at the entrance and exit to provide for introducing and removing substrates without interrupting the vacuum.

12. The structure claimed in claim 11 comprising, in addition, a ring clearance slot element between each formed chamber and compartment providing, in combination with the transport ring, controlled leakage path to insure the maintenance of the isolation of the several chambers.

13. Apparatus for sequential treatment of a substrate comprising:

a vacuum chamber having a plurality of sealed intermediate first regions, subdividing said vacuum chamber into a plurality of processing second regions; so as to dispose a said first region between and interconnected to two said second regions a single vacuum system for maintaining a selected degree of vacuum in each of the plurality of processing regions of the chamber;

means to sputter and/or vacuum treat the substrate in a said processing region; and means for indexing the substrate through various processing regions.

* * * * *